United States Patent [19]
Denis et al.

[11] Patent Number: 5,308,233
[45] Date of Patent: May 3, 1994

[54] THERMAL TREATMENT UNIT FOR THE MANUFACTURE OF PET CONTAINERS

[75] Inventors: Gerard Denis, Turretot; Alain Evrard, Le Havre, both of France

[73] Assignee: Sidel, Le Havre Cedex, France

[21] Appl. No.: 62,815

[22] Filed: May 17, 1993

[30] Foreign Application Priority Data
May 20, 1992 [FR] France .................. 92 06126

[51] Int. Cl.$^5$ .................................. B29C 49/64
[52] U.S. Cl. ........................ 425/151; 425/174.4; 425/525; 425/526; 425/534
[58] Field of Search ............. 425/143, 522, 526, 528, 425/525, 534, 174.2, 174.4, 174.6, 174.8 R, 151, 154; 264/25, 327, 230, 235, 342 R, 346, 521, 530

[56] References Cited

U.S. PATENT DOCUMENTS

| | | | |
|---|---|---|---|
| 4,379,099 | 4/1983 | Ota et al. | 264/25 |
| 4,385,089 | 5/1983 | Bonnebat et al. | 264/530 X |
| 4,572,811 | 2/1986 | Ota et al. | 264/25 |
| 4,657,502 | 4/1987 | Rydmann | 425/534 X |
| 4,729,732 | 3/1988 | Schad et al. | 425/526 |
| 4,836,971 | 6/1989 | Denis et al. | 264/521 |
| 4,846,656 | 7/1989 | Denis et al. | 425/526 X |
| 4,928,835 | 5/1990 | Collette et al. | 264/235 X |
| 5,145,632 | 9/1992 | Denis et al. | 425/526 X |

FOREIGN PATENT DOCUMENTS

| | | |
|---|---|---|
| 0237459 | 9/1987 | European Pat. Off. . |
| 0442836 | 8/1991 | European Pat. Off. . |
| 54-68384 | 6/1979 | Japan .................. 264/521 |
| 54-103474 | 8/1979 | Japan .................. 264/346 |

OTHER PUBLICATIONS

References checked were either cited by applicants or cited in related cases SNs 07/654,701 and 07/868,734.

*Primary Examiner*—Richard L. Chiesa
*Attorney, Agent, or Firm*—Sughrue, Mion, Zinn, Macpeak and Seas

[57] ABSTRACT

A continuous-feed thermal treatment unit for the manufacture of PET containers includes, in succession, a recovery oven (25) and a crystallization oven (42) having respective heater plates (27, 44) for emitting medium-wavelength infrared radiation to heat the bodies of incoming, rotating, bidirectionally stretched, oversize containers to a temperature of 160°-2400°-C. The crystallization oven also includes short-wavelength infrared tubes (47) disposed along the path of the container necks, whose radiation penetrates the necks and heats support mandrels (18) inserted therein to transport the containers. The heated bodies shrink and become at least partially crystallized during their conveyance through the ovens, while the necks undergo spherulitic crystallization. The mandrels are carried at the outer ends of radial arms (15) mounted on links (12) joined by pivots (13) to form an endless conveyor chain (9) led over a portion of a drive wheel (10), during which the spacing between adjacent containers is increased to accommodate their relatively large incoming dimensions. As the conveyor chain and the containers transported thereby enter a straight run into the crystallization oven upon leaving the recovery oven, wherein they have contracted, the arms (15) return to a parallel orientation which attendantly decreases the spacing between the containers. The transported containers thus form a continuous curtain during their conveyance, which increases the thermal/energy efficiency of the treatment unit.

25 Claims, 7 Drawing Sheets

THERMAL TREATMENT UNIT FOR THE MANUFACTURE OF PET CONTAINERS

BACKGROUND OF THE INVENTION

This invention concerns improvements made to thermal treatment units used during the manufacture of containers, such as bottles made of polyethyleneterephthalate (PET), and capable of withstanding, during use and without appreciable deformation, relatively severe thermal conditions encountered during procedures such as filling the containers with a hot liquid or the pasteurization of their contents.

According to commonly assigned U.S. Pat. No. 5,229,042 a process suitable for the manufacture of containers of this kind consists of the following steps:

a) heating to a temperature at least equal to the PET-softening temperature the body only (excluding the neck) of a container preform made of noncrystalline PET; during this step, the neck of the container is already shaped and sized to its final dimensions;

b) molding the body of the heated preform so as to produce an intermediate container in which the dimensions of the body are approximately 20% in height and from 0 to 30%, measured transversely, greater than the dimensions of the final container to be produced, while the mold-shaped walls of the container are cooled to a temperature of approximately 5° to 400° C.;

c) next, heating the body of the intermediate container to a temperature of from 160° to 240° C. for about 1 to 5 minutes; and, during all or part of this body-heating procedure, also heating the neck under the temperature and time conditions required for the crystallization of the PET in the neck only, before undertaking relatively slow cooling of the neck; and d) finally, molding once again the heated contracted intermediate body produced at the end of the preceding step to its final shape and size, for a period of approximately 2 to 6 seconds.

To implement this process, the aforementioned patent also proposes container-manufacturing equipment incorporating, in particular, a thermal treatment unit capable of performing step c) of the process. In one special form corresponding to an implementation of the process that is preferred because of the simplicity of design underlying it, the thermal treatment unit comprises:

1) a heating device used to heat the entire intermediate container, both body and neck, the body being heated to a temperature of approximately 160° to 240° C. to provide for the "recovery" and increased crystallinity of the PET in the body, and the neck being heated under time and temperature conditions suitable for crystallizing the PET of the neck alone;

2) cooling means configured so as to lower the temperature of the entirety of the container, both neck and body, the neck being cooled relatively slowly so as to crystallize the PET in the neck; and 3) potentially, but preferably incorporated into the thermal treatment unit, another heating device configured to heat the body of the container before the final molding step specified under stage d) of the process.

The main advantage obtained using the thermal treatment unit in the manufacturing equipment proposed in the U.S. '042 patent consisted in combining two steps, i.e., spherulitic crystallization of the PET in the neck alone and thermal treatment of the body of the container, which had heretofore been carried out separately in a crystallization oven and in an oven termed a "recovery" oven, respectively. By the word "recovery" is meant the relaxation of the internal stresses induced in the PET during the two-way stretching operation (step b) of the process which produces the intermediate container, the material being allowed to freely undergo deformation, this recovery step producing a container having a contracted, irregular body.

However, the practical utilization of a thermal treatment unit of this type meets with various difficulties which call into question the simple end-to-end juxtaposition of the conventional crystallization and "recovery" ovens.

The main difficulty lies in the search for optimization of the energy consumption of the unit, while also allowing for adherence to the accurate performance of the steps of the process being implemented. In fact, in order to be optimally used and to avoid energy wastage, the thermal energy generated in the ovens by electric heating requires that the containers travel through the oven, while being arranged as closely as possible to each other, so that all of the radiation is intercepted by the material to be treated. During treatment, the material becomes significantly deformed, as indicated above. The intermediate container placed in the "recovery" oven is oversized as compared to the final container (e.g., an intermediate container having a diameter of approximately 110 mm as compared with a final 1.5 liter container having a diameter of 90 mm), while the container emerging from the recovery oven is appreciably contracted and undersized (diameter of about 80 mm in the example under consideration). Accordingly, the choice of a spacing distance between successive containers which is compatible with the large diameter of the intermediate containers leads to considerable loss of thermal energy, and thus to excessive electrical consumption, when weighed against the result obtained during the succeeding steps involving the contracted containers, which are thus spaced unnecessarily far apart.

Another problem concerns the conditions under which the crystallization of the necks of the containers takes place. When crystallization is carried out on the necks of the preforms during an initial step, the preforms can be juxtaposed in succession in such a way that the thermal output of crystallization heating proves satisfactory. On the other hand, in the aforementioned process the crystallization of the material in the neck is carried out on a container whose body diameter, which is greater than that of the neck, leads to a significant spacing separation of the necks of successive containers, which impairs good thermal output. As an example, the center-to-center distance between the necks, which is 65 mm for the preforms, increases to 140 mm for the containers. The result is a significant decrease of thermal output and an increased length of the crystallization oven.

Still in the area of energy yield, it must be noted that the ovens used heretofore were equipped with heating tubes arranged in rows extending over the height of the bodies of the containers to be heated and which emitted short-wavelength infrared radiation, and with heating resistors, so that the bodies of the containers which passed through the oven were heated mainly, not directly by the infrared radiation, but indirectly by the heated atmosphere of the oven (convection heating). As a result, the energy yield of this type of oven was mediocre and electrical consumption high.

Furthermore, the correct implementation of the various steps of the container-heating process required observance, in particular, of the material-treatment times, as regards both heating and cooling. While proper mastery of the heating conditions, in particular by reducing losses to the fullest extent possible so that the highest possible fraction of the thermal energy generated actually reaches the material to be treated, makes it possible to minimize the heating time, cooling, or temperature reduction, must, on the other hand, occur under completely controlled time conditions (e.g., approximately 20 to 25 seconds), so as to preserve actual uniform crystallization in the material. Now, the search for ever-increasing manufacturing outputs (e.g., 6000 containers/hour) calls for high travel speeds for the containers in the equipment, and thus a lengthening of the distances traveled in the cooling stations, so as to conform to the required cooling times. The result is a concomitant lengthening of the equipment, thereby raising installation costs.

Another problem lies in the need for the effective thermal protection of the moving mechanism, which must be able to function without problems in atmospheres of varying temperatures (between 100° and 200° C.) and under very high temperatures (approximately 200° C.) in the areas of intense heating.

SUMMARY OF THE INVENTION

Thus, this invention is mainly intended to propose an improved configuration of a thermal treatment unit for containers, in particular those made of PET, during their manufacture, such unit combining the heating of the body of the intermediate containers, the crystallization heating of the necks alone of the containers, and the controlled cooling of the entirety of the containers capable of ensuring the effective, uniform crystallization of the necks, and preferably, a new heating operation on the containers prior to their final molding, this thermal treatment unit being capable of generating a considerably improved thermal output leading to an appreciable reduction of electrical energy consumption, simultaneously allowing improved control of the parameters for the treatment of the material of the containers, thereby giving improved properties to the final containers leaving the production line, and exhibiting structural properties which provide for reliable operation at high speed (e.g., 6000 or more containers/hour) despite high localized temperatures (at least 200° C.), while being less cumbersome.

To these ends, the invention proposes a continuous-travel thermal treatment unit used during the manufacture of containers, such as bottles, made of polyethyleneterephthalate (PET) and capable of withstanding, during use and without appreciable deformation, the relatively severe thermal conditions encountered during processes such as filling the containers with a hot liquid or the pasteurization of their contents, the unit comprising:

a) heating means for heating the entirety of each container, both body and neck, the body made of PET having preliminarily undergone two-way directional stretching and being heated to a temperature of approximately 160° to 240° C. to produce recovery, then increased crystallinity, and the neck, made of still-non-crystalline PET being heated under temperature and time conditions suitable for producing spherulitic crystallization of the PET in the neck alone; and b) cooling means configured so as to lower the temperature of the entirety of each container, both neck and body, the cooling of the neck being carried out relatively slowly so as to ensure the crystallization of the PET in the neck.

The thermal treatment unit, which is configured in accordance with the invention, basically includes, in combination:

a) means used to heat the entirety of each container incorporating:

1) means for heating the bodies of the containers and positioned facing and in proximity to the bodies and extending continuously over approximately their height, the body-heating means being configured so as to emit, in the direction of the bodies, medium-wavelength infrared radiation having a wavelength greater than, or equal to, 2 $\mu$m, the body-heating means comprising heating means designed for recovery and heating means designed to increase the crystallinity rate (crystallization) of the PET in the body; and 2) means for heating the necks of the containers and extending opposite the necks, and configured so as to emit, in the direction of the necks, short-wavelength infrared radiation having a wavelength less than, or equal to, 2 $\mu$m, the neck-heating means being linked to an internal heating mandrel inserted inside the necks, and extending at least partially following the body-heating means designed for "recovery" and in combination with the heating means designed for the crystallization of the bodies; and b) means for modifying the spacing distance between containers configured in such a way that the containers exhibit a large spacing distance opposite the body-heating means in the recovery area while the bodies have a relatively large transverse dimension, and a reduced spacing distance opposite the body- and neck-heating means within the crystallization area while the heated bodies have shrunk and have reduced transverse and longitudinal dimensions.

To bring together in one unit the various heating means required for the thermal treatment of the containers, and thus to simplify the overall configuration, to reduce manufacturing and operating costs, and to reduce the space taken up by the equipment, it is desirable that the thermal treatment unit further comprise means for the final heating of the containers preliminarily to their final molding, such final heating means being positioned following the cooling means.

The means for heating the bodies of the containers preferably incorporate heating plates extending over approximately the height of the bodies, and they emit medium-wavelength infrared radiation having a wavelength greater than, or equal to, 2 $\mu$m. The plates are capable of being positioned on the same side of the path traveled by the container bodies, a mirror being positioned opposite the plates on the other side of the path of the bodies; or else, the plates are arranged facing each other on either side of the path traveled by the bodies of the containers, in order to improve the uniformity and homogeneity of the body-heating operation.

Preferably again, the means for heating the necks of the containers for the purpose of PET crystallization are produced as heating tubes extending parallel to the direction of travel of the containers and emitting short-wavelength infrared radiation whose major portion has a wavelength less than, or equal to, 2 $\mu$m.

By virtue of the basic provisions of the invention, an approximately constant spacing is ensured between the successive containers, whatever their transverse dimension; i.e., first, between large-size containers having a large diameter, then between containers having been heated and shrunk, thereby having a smaller diameter. Steps may be taken to ensure that the spacing between successive containers is as small as desired, while being absolutely certain, however, that the containers do not touch and while leaving a safety margin sufficient to ensure that poorly positioned containers or containers asymmetrically contracted can turn on themselves without touching adjacent containers (since the containers are rotated on themselves during their travel through the thermal treatment unit, so as to be uniformly exposed to the thermal radiation emanating, in general, from a laterally-positioned source). As an example, the center-to-center distance between successive containers will be approximately 140 mm for large-size containers (body diameter of approximately 110 mm) and approximately 105 mm for contracted containers, in a process for the manufacture of bottles having a capacity of 1.5 liters, which, when finished, have a body diameter of 90 mm. The containers thus form an approximately uniform curtain which travels in succession in front of the heating mechanisms and which receives the largest portion of thermal radiation emanating therefrom, which are, for the most part, laterally positioned.

As regards the heating means, their division into two types of heating mechanisms having different properties makes it possible to ensure perfect adaptation of the heating of the necks, on the one hand, and the heating of the bodies, on the other, to the special conditions required for suitable heating of these two parts of the container, special conditions which inhere in the very different thicknesses of the material; e.g., approximately 0.2 to 0.3 mm for the bodies and approximately 2 to 3 mm for the necks.

To heat the bodies rapidly, medium-wavelength infrared radiation ($\lambda \geq 2$ μm) is used, for which the PET is virtually opaque and which, since it is absorbed by the thin wall of the body, consequently heats the wall in a very brief time. Moreover, recourse to a radiation source formed by a series of plates extending approximately over the entire height of the bodies of the containers makes it possible to emit, in the direction of the bodies, a uniform, homogeneous flow of radiation over their entire height. Here again, improved heating efficiency is achieved. Furthermore, the use of plates in place of the batteries of tubes widely used heretofore results in less electrical wiring. In addition, plates are stronger than tubes. The overall result is lower installation and maintenance costs and greater machine reliability.

It may also be added that the use of radiant heating provides for flexibility of use and of adjustment, which proved impossible in atmospheric heating (convection heating) used in the past. More specifically, the heating plates can be divided into sub-plates which can be juxtaposed and stacked along the vertical dimension of the container bodies and controlled individually so as to heat, accurately and selectively, different areas thereof (e.g., areas corresponding to different thicknesses of the material).

This improved thermal treatment of the material making up the bodies has very important consequences for the quality of the final containers. In fact, perfectly-controlled rapid heating of the PET in the bodies gives a rate of crystallization which is appreciably greater than that heretofore realized (40 to 50% as compared with 35 to 40% using an oven according to prior art), thereby providing a higher modulus of elasticity and thus better temperature resistance of the finished containers. The latter can withstand filling with a liquid heated to 100° to 105° C., as compared with only 95° C. for containers manufactured previously. Furthermore, the walls of the bodies of the containers have a much more uniform thickness, and thus better mechanical strength, by virtue of the disappearance of weakened areas corresponding to areas of lesser thickness in containers according to prior art.

Finally, it must be added that the use of a heating procedure for the container bodies using radiation in place of ambient heating according to the prior art makes it possible to reach much faster the temperature required for "recovery" (160°-240° C., and preferably about 200° C.), a time which can now be reduced to approximately 5 to 5.5 seconds.

To illustrate what has been said, by virtue of the combination of improved heating and a modification of the spacing distance separating the containers, electrical power consumption has been reduced by approximately 20% as compared with an oven according to prior art, for the heating of the bodies alone.

On the other hand, as regards the heating of the container necks, the use of the same medium-wavelength infrared radiation ($\lambda \geq 2$ μm) as that used for heating the bodies would produce non-homogeneous heating and the creation of a thermal gradient through the thickness of the material because of the relatively slow propagation of the heating, beginning on the outer surface of the neck, i.e., the only heated part. It is thus much wiser at this point to implement another process which utilizes radiation containing a large proportion of short-wavelength infrared ($\lambda \leq 2$ μm) for which the PET is virtually transparent and which, after passing through the thickness of the neck material, reaches the mandrel inserted inside the necks.

Here again, the use of a process completely adapted for heating the necks to a temperature high enough to generate spherulitic crystallization of the PET makes it possible to simultaneously reduce the heating time and the electrical energy required.

In the same representative example as that provided above for the recovery of the bodies, the neck-heating time was previously 65 seconds for a center-to-center distance between containers measuring 65 mm, which corresponds to a time of 97 seconds for a center-to-center distance of 105 mm. In the configuration according to the invention, the neck-heating time is 25-30 seconds for a center-to-center distance between containers of 105 mm, using radiation sources positioned on each side of a linear path. Furthermore, the installed electric power was appreciably reduced under the conditions specified by the invention.

Eventually, by bringing together the various provisions and features of the invention, the installed electrical power needed to heat the bodies and crystallize the necks was reduced by approximately 28% in this part alone of the thermal treatment unit.

Moreover, it may henceforth be indicated that, by virtue of the structural simplifications produced by combining the body-recovery and neck-crystallization processes and various improvements to be discussed below, the cost of a recovery/crystallization oven according to the invention is about 28% lower than the cumulative costs of a recovery oven and a crystallization oven required previously.

In a preferred embodiment, the thermal treatment unit in accordance with the invention is characterized by the fact that, for the transport of the containers, the unit incorporates an endless conveyor chain comprising a series of links joined together around their respective axes, each link being fitted with a device which supports the necks of a container; by the fact that the means for changing the spacing distance between containers comprise:

a) projecting arms solidly attached respectively to the links of the conveyor belt and extending transversely to the links, the free ends of the arms being equipped with the above-mentioned container-support devices;

b) a convex curvilinear support which movably supports the links of the conveyor chain while the arms of the links extend to the outside of the convexity, thus producing a larger spacing distance between containers; and c) at least one rectilinear support following the curvilinear support, which movably supports the links of the conveyor chain while the arms of the links are approximately parallel, thereby reducing the spacing distance between containers;
and by the fact that the means for heating the container bodies and the means for heating the container necks are configured in approximately parallel fashion in relation to the path of the conveyor chain, the body-heating means designed for recovery being positioned approximately parallel to the curvilinear support portion of the conveyor chain, and the container neck-heating means being at least partially positioned in parallel fashion in relation to the rectilinear support portion of the conveyor chain.

Because of this configuration, the spacing distance between containers is modified, as a function of the curvature of the convex curvilinear support and of the length of the arms, from a large spacing distance in the curvilinear path of the conveyor chain opposite the container body-heating means designed for recovery while the bodies have a relatively large transverse dimension, to a reduced spacing distance in the rectilinear path of the conveyor chain opposite the container body- and neck-heating means designed for crystallization while the bodies have contracted and have reduced transverse and longitudinal dimensions.

The curvilinear support of the conveyor belt is advantageously a rotating wheel, and the container body-heating means designed for recovery are positioned on a line shaped approximately like the arc of a circle and substantially parallel to the rim of the wheel.

It is desirable that the heating means designed for crystallization of the necks partially extend into the area occupied by the container body-heating means designed for recovery. The neck-heating means may then be combined with the body-heating means within the same high plates extending over the entire height (bodies and necks) of the large-size containers.

The combination of the preceding provisions makes it possible to position the container-body heating means designed for recovery and a portion of the container neck-heating means on one curvilinear end of the treatment unit, so that the following rectilinear part is shortened proportionately. As a result, the thermal treatment unit configured according to the invention is shorter and thus more compact than equipment according to the prior art.

Advantageously again, means are provided for preheating the container necks before they receive the mandrels, whose outer diameter matches the inner diameter of the necks, by virtue of which arrangement the preheated necks are pushed more easily onto the mandrels. In this case, each support mechanism fitted on the end of an arm of the conveyor chain is preferably formed by a movable mandrel, which can be inserted by force into the container neck and can support each container suspended by the neck.

Optionally, the thermal treatment unit can further comprise means for heating the container bottoms, these means being combined with the body-heating means in order to increase the crystallinity rate of the bodies and being positioned beneath the latter means and laterally, so as to heat the container bottoms without causing crystallization of the central area of the bottoms.

It is desirable that the cooling means comprise atmospheric heating means capable of maintaining a temperature of between 80° and 200° C., and preferably approximately 100° C., surrounding the containers. By virtue of this arrangement and by avoiding excessive cooling of the containers, the differential between the temperature of the containers entering the final heating means and the temperature of the heated containers in these means is reduced. Consequently, the electrical power needed for these final heating means is further reduced.

Moreover, it is noteworthy that second means for modifying the spacing distance between containers are installed downstream from the final heating means and are capable of increasing the spacing distance, in order to allow a container-gripping device for each container to be inserted between the successive containers so as to transfer the containers from the thermal treatment unit.

Given the very high temperatures produced for the container-heating operation (over 200° C.), it is desirable to protect the mechanical unit against the disruptive effects caused by these high temperatures (i.e., jamming, deterioration of lubricants, etc.). Provision is thus made to ensure that means for thermal protection of the mechanical components blow a curtain of cooling gas between these components and the heating means, that the frame of the unit be made up at least partially of tubular sections, and that this cooling gas be distributed by these tubular sections.

In the event that the containers are stopped in front of the heating plates, the overheated PET releases gases which are self-igniting. Even if this stoppage is accompanied by a cutoff of the electrical supply to the plates, the thermal inertia of the plates is such that the risk of fire nevertheless remains. It is thus desirable that the thermal treatment unit be fitted with a safety mechanism linked to the heating plates and configured so as to increase the distance separating the heating plates from the containers in the event that the containers are stopped. This safety mechanism can act on the heating plates (plates mounted so as to travel on slide-tracks either transversely to the path of the containers so as to be moved away from them, or vertically so as to be raised above or lowered beneath the containers) or on the containers (release and fall of the containers positioned facing the plates), and the control mechanism must be non-electrical, e.g., in particular, pneumatic jacks, so that it remains functional in the event of a cutoff of the electrical power.

DETAILED DESCRIPTION OF THE PREFERRED EMBODIMENTS

Figure 1:
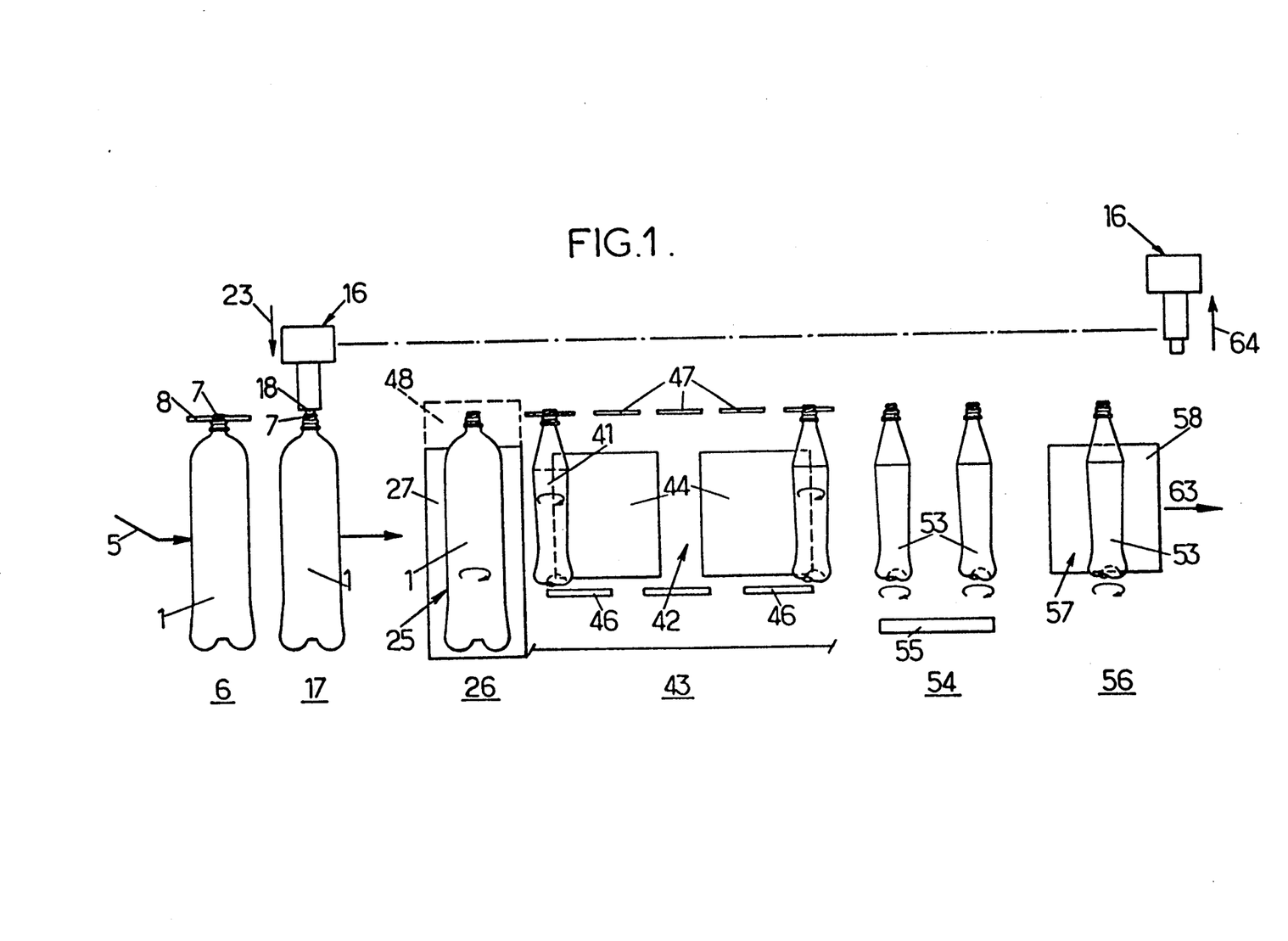
FIG. 1 is a linearly-developed schematic view illustrating the main container treatment steps carried out by the treatment unit according to the invention.
Figure 2:
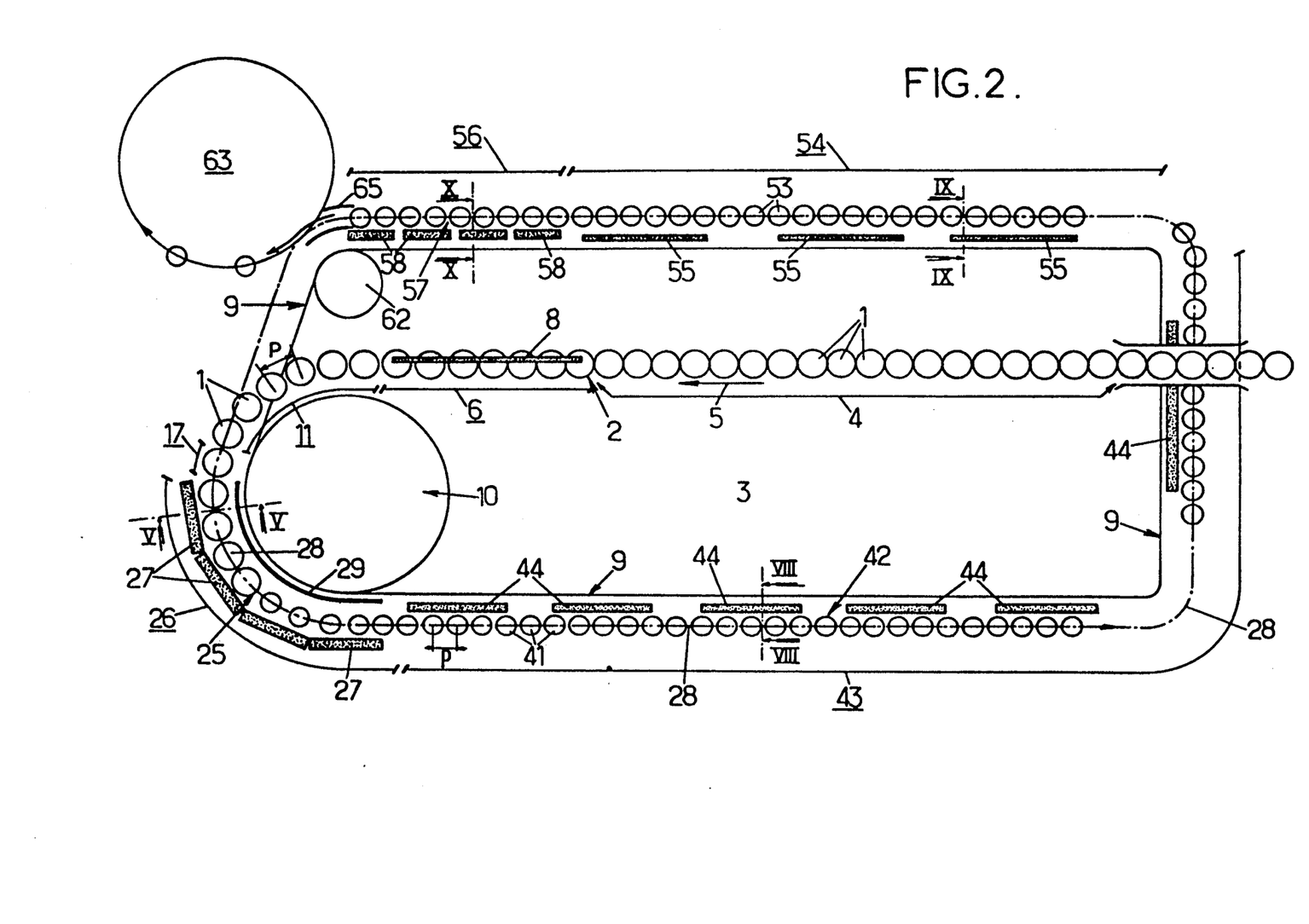
FIG. 2 is a schematic top view illustrating the overall configuration of the thermal treatment unit according to the invention, as well as the positioning of the main container treatment step shown in FIG. 1.

With simultaneous reference to FIGS. 1 and 2, intermediate containers 1 having oversized bodies made of two-way stretched PET and produced using a molding process according to the prior art are transported (arrow 5) to the entry 2 of the thermal treatment unit (referenced in its entirety by 3) by means of a chute 4.

In an area 6 located following the entry 2, the containers are separated from each other by a constant spacing distance using conventional means designed for that purpose (e.g., an endless screw system which grasps the containers by their bodies), while, at the same time, the necks 7 of the containers 1 undergo preheating at a temperature of approximately 50° C. (preheating tube 8) designed to slightly expand the PET in the necks, for the purpose of a subsequent operation to be indicated below.

The containers are then transferred (area 11) in the transport mechanism, which moves them through the entire thermal treatment unit 3 up to the outlet of the unit. The transport mechanism basically comprises a jointed structure closed on itself and forming an endless conveyor chain 9 having mutually-pivoting links, each of which is configured to support a container by its neck. This transport mechanism further comprises a drive wheel 10 having a relatively large diameter on which the endless chain is wound, and which is configured to support and drive the chain, as well as motorized means which provide for the synchronous drive of the spacing mechanism and the drive wheel.

The conveyor chain 9 (see FIGS. 3 and 4) is formed by a series of links 12 joined to each other in free rotation by large-diameter pivots 13 capable of fitting into radial notches 14 provided on the perimeter of the wheel 10, which thus supports and drives the chain 9. Each link 12 is fitted with a transverse arm 15 extending radially outward (in the position in which the belt is wound on the wheel 10). The free end of each arm is fitted with a device 16 for gripping a container by its neck.

Figure 3:
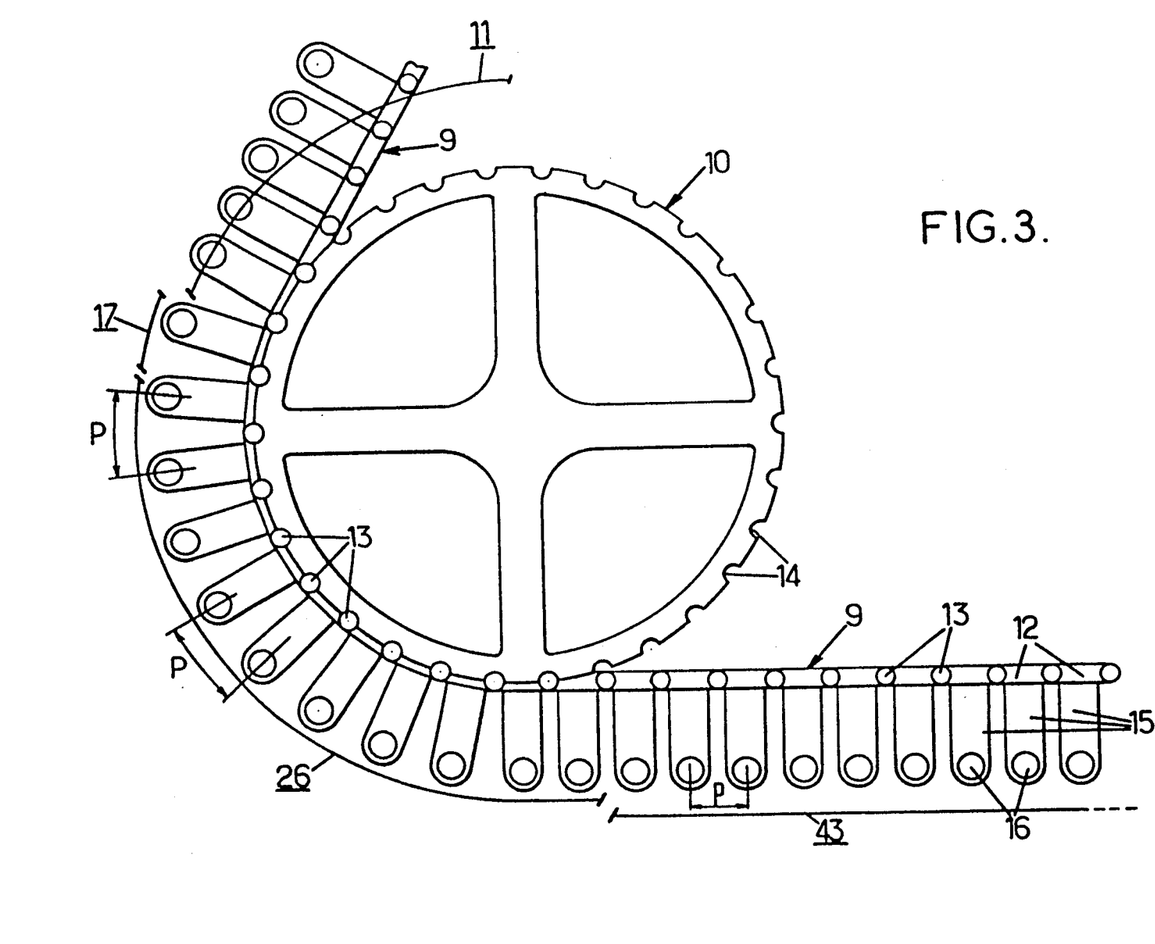
FIG. 3 a schematic top view of a portion of the container-transport means of the thermal treatment unit shown in FIG. 2.
Figure 4:
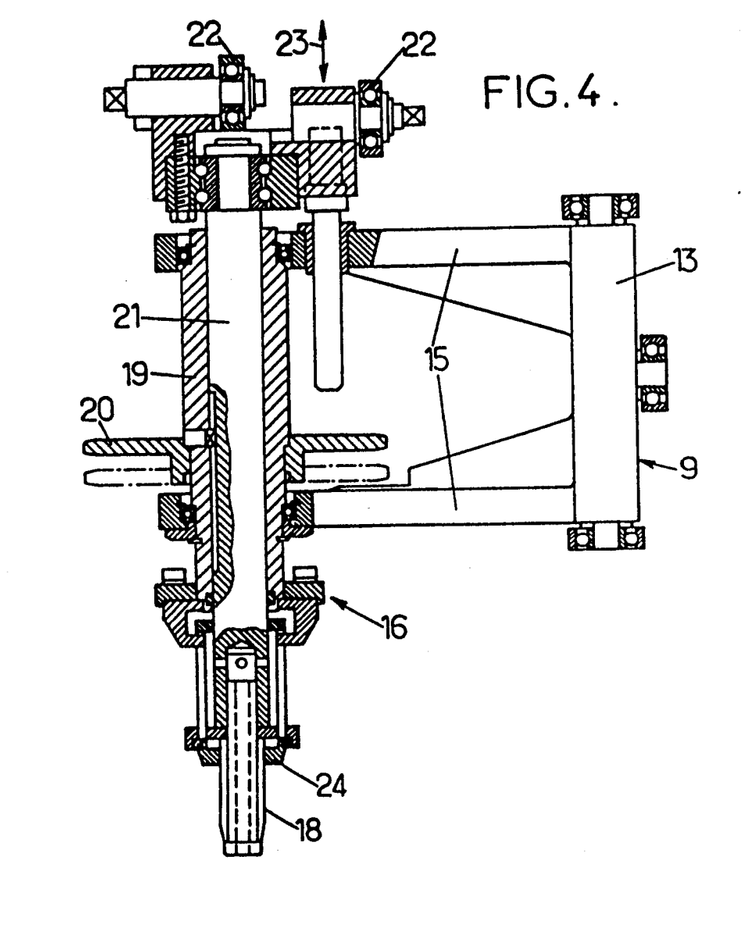
FIG. 4 is a partial vertical cross-section of the container-transport/gripping mechanism incorporated into the transport means in FIG. 3.

Each gripping device 16 is configured and controlled so as to grasp a container neck very rapidly at the end of the transport area 11 (gripping area 17 in FIGS. 1 to 3). To this end (see FIG. 4), each gripping device 16 comprises a vertical mandrel 18 which is movable in a jacket 19 supported in free rotation by the arm 15. The continuous rotation of the mandrel 18 around its axis is effected by a toothed wheel 20 wedged or otherwise fixed on the jacket 19 and working in conjunction with a drive chain (not shown) extending along the entire length of the path of the conveyor chain 9, so that, when travelling in front of the laterally-positioned heating means, the container bodies and necks are uniformly heated. Moreover, the upper end of a shaft 21 extending the mandrel 18 through the jacket 19 and projecting upward beyond it is fitted with rollers 22 which work in conjunction with stationary lateral cams (not shown), so as to raise and lower (double arrow 23) the mandrel 18 sequentially. Each mandrel 18 has a gauged outer diameter matching the inner diameter of the neck of the finished container. Thus, in the gripping (or "dressing") area 17, the mandrel 18 is thrust into the neck 7 of the container until an annular stop 24 surrounding the mandrel 18 and supported by the lower end of the jacket 19 engages the edge of the neck. This "force-fits" the previously heated, and thus slightly expanded, PET in the neck, so as to impart the nominal diameter and to hold the neck in place by means of friction. Accordingly, the mandrel now supports the container until it leaves the thermal treatment unit.

It will be noted that the gripping area 17 is located immediately downstream from the point where the chain 9 comes into contact with the toothed wheel 10, when the chain 9 takes on the curvature of the wheel 10. The diameter of the toothed wheel 10, the length of the links 12, and the length of the arms 15 are established in such a way that, as soon as the chain winds around the wheel 10, the ends of the radially-projecting arms 15 move away from each other by a center-to-center distance whose value P corresponds to the center-to-center distance separating the subjacent containers as they are fed.

Upon leaving the short "dressing" area, the containers, which are now transported away by the chain 9, travel into a first container body-heating oven 25, or recovery area 26, which extends over a little more than one-quarter turn of the rotation of the wheel 10 driving the chain 9. The oven 25 comprises a series of heating plates 27 arranged side by side and to the outside of the belt, and it adopts approximately the curvature of the trajectory 28 followed by the axes of the containers (in FIG. 2, four successive plates are used, an arrangement corresponding to a representative embodiment; this oven is illustrated schematically by a single plate in FIG. 1). Each plate extends over at least the height of the container bodies.

Each plate 27 is a medium-wavelength infrared radiation source (i.e., having a wavelength greater than, or equal to, 2 $\mu$m). This radiation, to which the PET is virtually opaque, is thus stopped by the thin wall of the container bodies and very rapidly heats the PET of these bodies to a temperature of from 160° C. to 240° C., typically around 200° C. The speed at which the containers file past is such that the heating time does not exceed 20 to 30 seconds, and is typically 5 to 5.5 seconds. This very short heating time is made possible by the high thermal output of the oven 25 produced, on the one hand, by the appropriate choice of heating vector, i.e., radiant heating using an appropriate wavelength, and, on the other, by the optimal close spacing of the successive containers which, by forming a true quasi-continuous curtain opposite the plates 27, absorb a maximum amount of the infrared radiation emitted.

Figure 5:
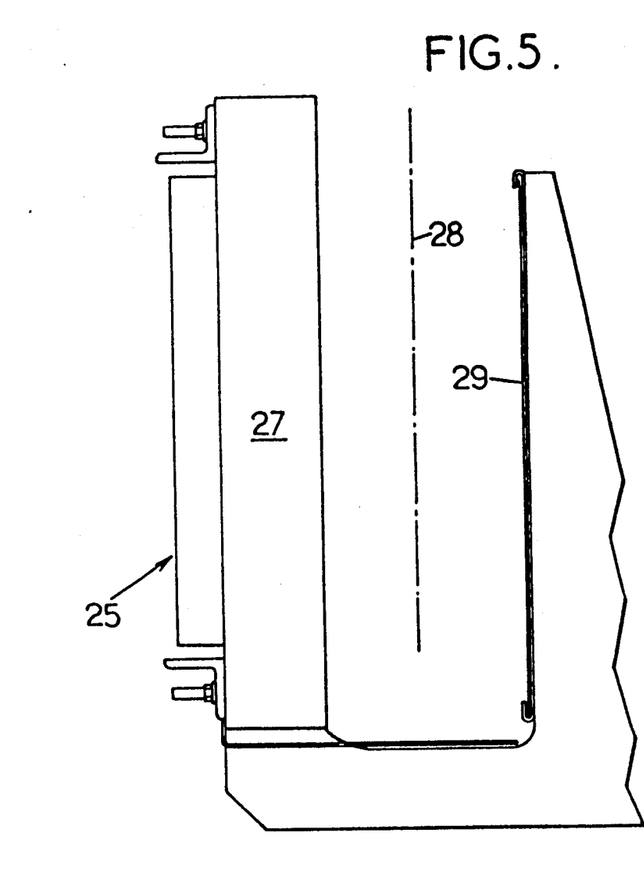
FIG. 5 is a transverse cross-section (along line V—V in FIG. 2) of a recovery oven of the thermal treatment unit in FIG. 2.

To improve the output of the oven still further, a curvilinear convex mirror 29 may be positioned opposite the plates 27 and on the other side of the chain 9. This mirror reflects toward the latter the fraction of infrared radiation that was not absorbed during its initial trajectory. FIG. 5 shows a transverse cross-section of the oven 25 made along line V—V in FIG. 2.

The use of heating plates (instead of the tubes used previously) gives many additional advantages. If all of the plates are fed with electricity in identical fashion, the electrical wiring is substantially simplified and installation and mounting costs of the wiring are appreciably reduced. However, since each plate is made of several elementary plates, or sub-plates, superposed and joined together one above the other, some applications allow different operating modes of the elementary plates, so as to produce appropriate selective conditions for heating the areas of the bodies arranged vertically (e.g., as a function of the variations in thickness of the container walls).

Figures 6, 9:
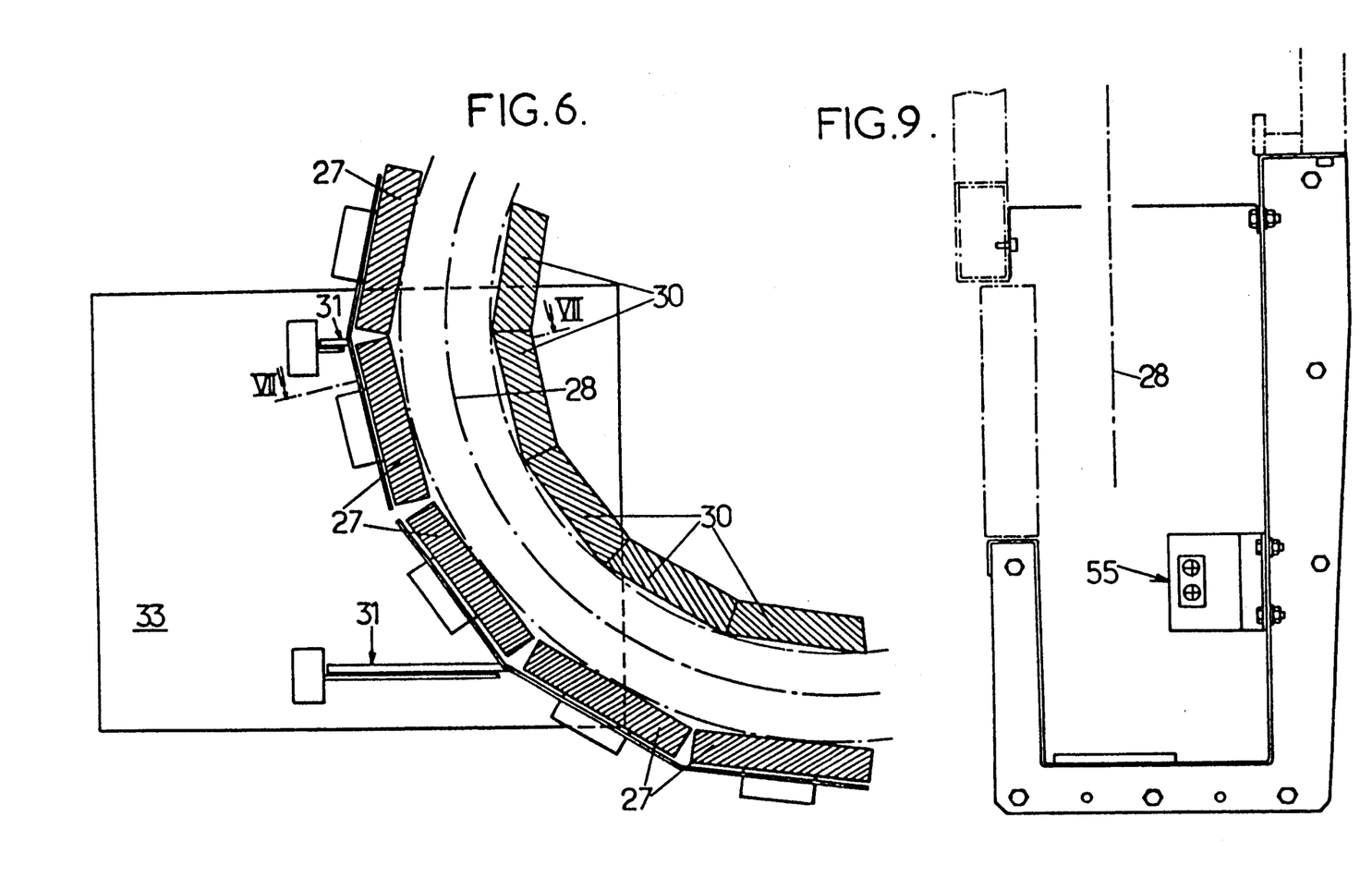
FIG. 6 is a schematic top view of a variant embodiment of the recovery oven shown in FIGS. 2 and 5.
FIG. 9 is a transverse cross-section along line IX—IX in FIG. 2 of the controlled cooling means of the thermal treatment unit in FIG. 2.

To improve the conditions for heating the container bodies, it is possible to contemplate a perfected version of the recovery oven, in which the mirror 29 is replaced by a second row of heating plates 30 positioned inside the curvature of the chain. FIG. 6 is a schematic top view of the configuration of an improved oven of this kind, which retains the same numerical references. The outer plates 27 and the inner plates 30 (five of each in this representative example) are positioned on either side of the path 28 followed by the containers. This arrangement, which provides more homogeneous and more even heating of the rotating container bodies, makes it possible to obtain containers whose bodies have contracted and shrunken more evenly circumferentially and which exhibit fewer deformations.

To improve safety and avoid self-ignition of the overheated PET in the event the unit is stopped during manufacture (in particular because of a cutoff of electrical power), i.e., overheating caused by the high thermal inertia of the heating plates 27 and 30, the heating plates may be installed in a special way which automatically moves them away from their normal heating position as soon as the chain 9 is stopped. This arrangement is shown diagrammatically in top view in FIG. 6, and in greater detail in FIG. 7.

Figure 7:
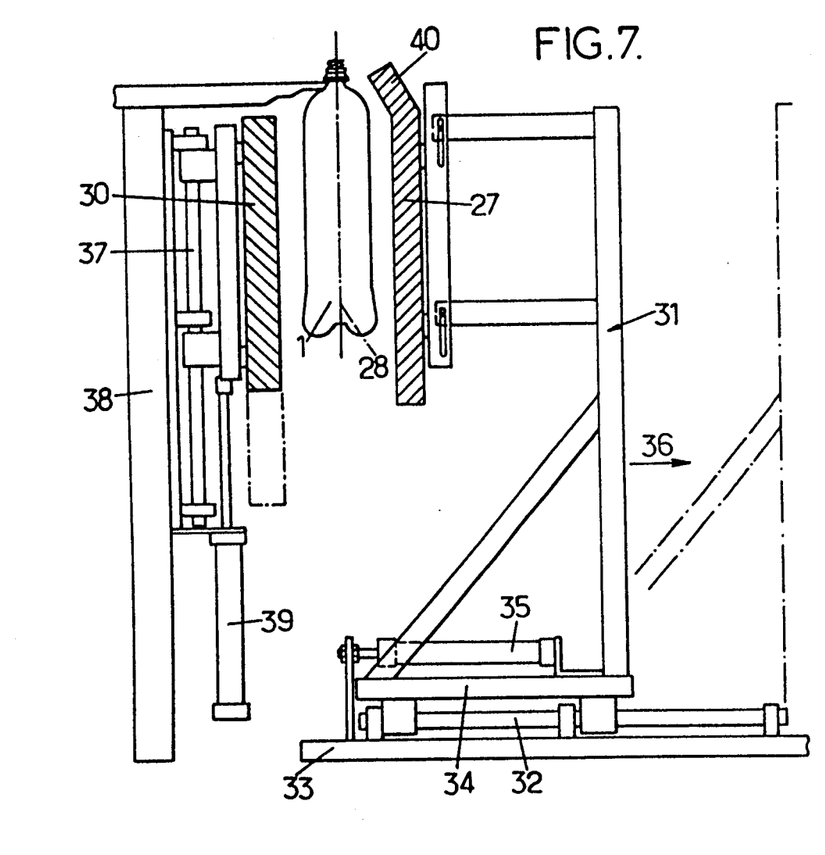
FIG. 7 is a transverse cross-section along line VII—VII in the variant embodiment of the recovery oven in FIG. 6.

First, the outer heating plates 27 are supported at the upper end of a bracket 31 whose mounting 34 is slidable on tracks 32 resting on a support plate 33. A pneumatic jack 35 interposed between the support plate and the mounting makes it possible to move the bracket 31 (arrow 35), and thus the heating plates 27, away from the containers 1 (i.e., to the outside of the curve along which the chain 9 runs in the example shown). As illustrated in FIG. 6, a single bracket may be configured so as to support several heating plates 27.

Another possible configuration which proves useful when there is a lack of available space extending transversely, as is the case here for the inner heating plates 30 because of the presence of the drive wheel 10, implements moving the heating panels vertically (in the present instance, in lowering them). To this end, as shown in FIG. 7, the heating panels 30 are supported by vertical slide-tracks 37 mounted on a suitable base 38, and can be moved on the tracks when acted upon by a pneumatic jack 39.

The choice of pneumatic jacks linked to triggering means controlled by the stoppage of the chain 9 makes it possible to move the heating plates 27 and 30 in the event of a cutoff of electrical power.

In addition, FIG. 7 illustrates a special configuration of the outer heating plate(s) 27, which is fitted with an additional upper panel 40 sloping toward the containers 1 in order to heat the shoulders of the containers below the necks.

Upon leaving the recovery oven 25, the chain 9 separates from the drive wheel and then follows a rectilinear trajectory. Because of the elimination of the curvature imparted by the wheel 10, i.e., a curvature which kept the ends of the arms 15 of the chain, and thus the containers, separated from each other by a large space or center-to-center distance P, the ends of the arms are now brought closer together, the arms being approximately parallel to each other. The containers are thus supported while being separated by a shorter space or center-to-center distance p compatible with the reduced diameter of their contracted bodies (container 41).

Upon leaving the recovery oven 25, the shrunken containers enter a crystallization oven 42 (area 43 in FIGS. 1 and 2) through which the conveyor chain 9 passes in a straight line. This oven heats, on the one hand, the necks in order to achieve spherulitic crystallization of the PET, and, on the other, the contracted bodies, in order to raise the crystallinity rate of the PET, which the prior bidirectional orientation brought to a value of approximately 20 to 25%.

As shown in FIG. 2, the crystallization oven 42 can extend in an angled configuration along two straight lines (or a series of straight lines) connected by one or several bends.

Figure 8:
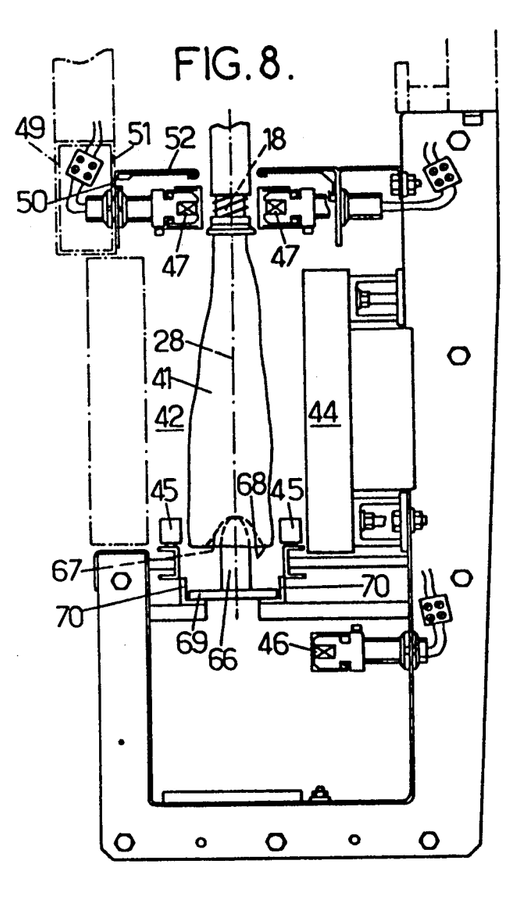
FIG. 8 is a transverse cross-section along line VIII—VIII in FIG. 2 of a crystallization oven of the thermal treatment unit shown in FIG. 2.
Figure 10:
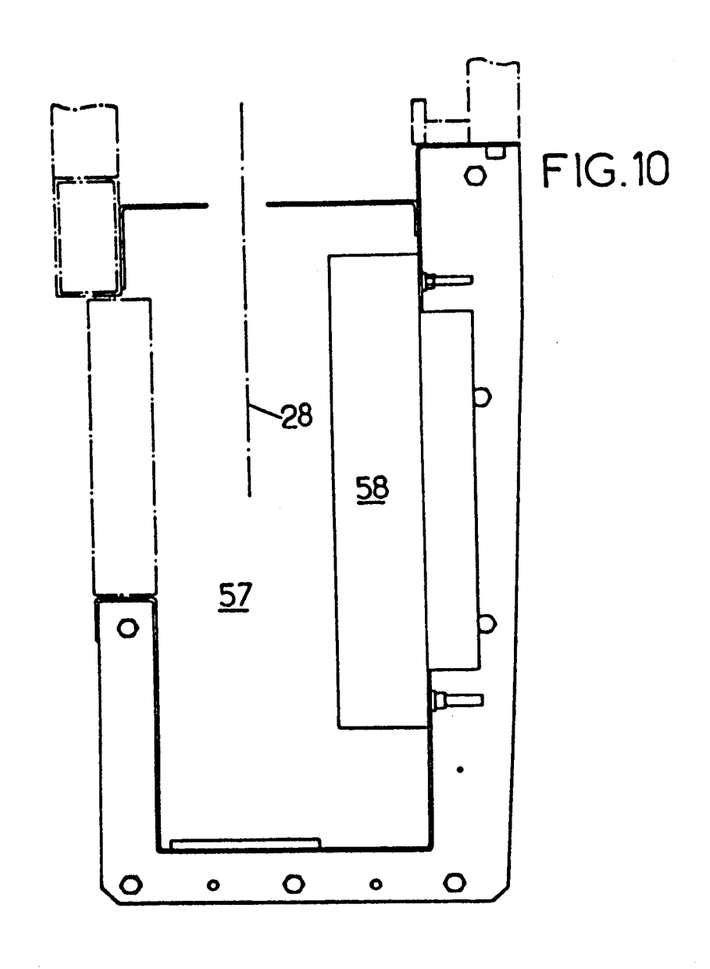
FIG. 10 is a transverse cross-section along line X—X in FIG. 2 of the final heating oven of the thermal treatment unit in FIG. 2.

To keep the container bodies 41 emerging from the recovery oven at high temperature, in order to raise their crystallinity rate, the crystallization oven comprises (as illustrated in FIGS. 2 and 8), a series of heating plates 44 configured, like the heating plates 27, so as to emit medium-wavelength infrared radiation, the height of the plates being adapted to the reduced height of the contracted container bodies 41.

To guide the container bodies 41, loose rollers 45 made of a material inert to heated, softened PET, e.g., a ceramic, are installed opposite the lower parts of the bodies. In this way, the container bodies are prevented from touching the heating plates 44, even if the bodies are deformed and curved longitudinally under the action of the heat. Given the softening of the PET, these rollers can even cause a relative straightening of any twisted bodies, thereby proving beneficial for the final blowing step.

To further improve the guidance and position-retention of the containers, centering pins 66 positioned coaxially underneath the mandrels 18 and configured to work in conjunction with the bottoms of the containers 41 are also installed in the crystallization area. In particular, these finger-shaped pins 66 are engaged in the concavities 67 in the bottoms of the containers, so that the rotation of the containers 41 occurs around their axes, shared by the mandrels and the pins. The pins 66 are spaced apart by the same distance p as that separating the mandrels, and are moved in synchronism with the latter. Accordingly, they can, for example, be supported by respective bars 69 attached to an endless drive device (chain or belt, not shown in FIG. 8) and guided on L-shaped longitudinal corner irons 70 attached to the frame.

If one desires to improve the crystallization of the bottoms of the container bodies 41, the action of the heating plates 44 may be strengthened by attaching to them heating tubes 46 (which emit short-wavelength infrared radiation) positioned in the lower part of the tunnel (FIG. 8).

To provide for the crystallization of the noncrystalline PET in the container necks, the crystallization oven 42 is equipped with two parallel sets of heating tubes 47 arranged in succession on either side of the necks and in proximity to them. These tubes 47 emit a short-wavelength infrared radiation which passes substantially through the PET in the neck, which is relatively transparent to this type of infrared radiation, and which reaches the mandrel 18 located inside the neck. The mandrel 18 thus heated transmits its heat back to the PET of the neck, with which it is in close contact.

To accelerate the heating of the necks to a sufficient crystallization temperature (110° to 200° C., and preferably 140° C.) and to shorten the thermal treatment unit 3, the heating of the necks can be started inside the recovery oven either by installing heating tubes 47 in the upper part of the oven, or (because of substantial clutter in this area) by extending the heating plates 27 upward, as suggested by the dashed area 48 for plate 27 in FIG. 1.

To reduce the harmful effect of the heat released in the ovens 25 and 42 on the moving mechanical components (in particular, the mechanical parts associated with the mandrels 18) and also on the heating tubes (in which the connection bushings are, in particular, destroyed by excessive heat), cooling is provided by blowing a cooling gas (air) on the mechanical parts surmounting the ovens and on the mounting bases of the heating tubes 47. To this end, in order not to complicate the equipment, as shown in FIG. 8 the upper part of the frame of the equipment, in particular the longitudinal members 49 supporting the bases of the heating tubes 47, are produced as tubular sections joined together impermeably and to which cooling-air blowing means (not shown) are attached. These sections 49 have openings 50 at right angles to the mounting bases of the tubes 47 and openings 51 distributed longitudinally above a protective shield which covers the tubes 47, for blowing air toward the moving mechanical parts.

At the outlet of the crystallization oven 42 (end of area 43), the containers 53 have a neck which is completely crystallized (spherulitic crystallization) and whose bodies have a crystallinity rate reaching 45 to 50%.

The visible, increased efficiency of the crystallization oven and of the recovery oven is the result, on the one hand, of a suitable choice of heating mechanisms, and, on the other, of a shortened spacing, or center-to-center distance, p between containers 41.

Following area 43 and after a new bend, there is a linear area 54 fitted with means for the controlled cooling of the bodies and necks of the containers 53, so as to allow the spherulitic crystallization of the necks to intensify. At this stage, overly-pronounced cooling (e.g., to a temperature of 20° to 40° C.) does not seem appropriate, since it would then be necessary, before continuing with the final molding of the container bodies so as to impart to them their final shape, to heat the bodies back up to the PET-softening temperature (preferably 160° to 240° C.) by supplying a substantial amount of calorific energy.

To avoid this difficulty, the containers are kept at a relatively high ambient temperature, e.g., approximately 80° to 200° C. and preferably approximately 100° C., a temperature which promotes the growth of crystallization of the PET. To this end, as shown in FIGS. 1, 2, and 9, in this area 54 of controlled cooling the thermal treatment unit 3 is equipped with atmospheric or convection heating means 55, which may be of any kind suitable for this purpose.

After the controlled cooling area 54, another heating area 56 is formed by a final heating oven 57 capable of heating to the PET-melting temperature only the bodies of the containers 53, whose necks have been crystallized. The oven 57 comprises several heating plates 58, which emit medium-wavelength infrared radiation. The plates 58 are faced outward from the equipment so as not to affect the containers passing through the equipment entry 2 located in proximity and to the rear.

Figure 11:
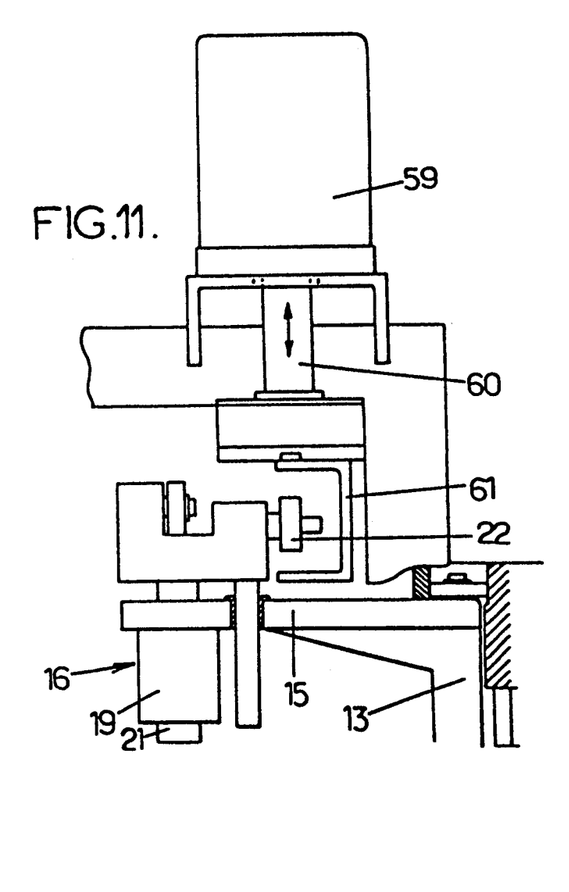
FIG. 11 is an enlarged detailed view of the final heating oven in FIG. 10.

As is the case for the recovery oven 25, safety is enhanced by fitting the final oven 57 with a mechanism which prevents the containers from remaining opposite the heating plates 53 in the event of stoppage of the conveyor chain 9. These means are configured to release the containers in the oven and cause them to fall. Referring to FIG. 11, a pneumatic jack 59 mounted to the equipment frame supports, at the end of its movable shaft 60, a profile section 61 shaped like a U lying on its side, whose lower arm is disposed beneath the path of one of the rollers 22 supported by the upper end of the shaft 21 supporting the mandrel 18. The stoppage of the conveyor chain 9 activates the pneumatic jack 59, whose shaft 60 is driven upwards and, by means of the section 61 and the rollers 22, drives the shafts 21 of all of the gripping devices 16 in the oven. The mandrels 18, which return upwards, emerge from the necks of the containers, which they support, and the containers then fall.

After leaving the final heating oven 57, the conveyor chain 9 travels on a wheel 62. In consequence, the arms 15 of the chain 9 move apart, thereby causing an extension of the center-to-center distance separating the heated containers 53, so that they can be easily grasped by a transfer mechanism (not shown) which transports them to a rotating molding unit 63. At the same time that each container is grasped by the transfer mechanism, the mandrel 18 supporting it is raised (arrow 64 in FIG. 1) so as to be taken out of the neck, and the chain 9, now empty, continues to advance toward the wheel 10 located in proximity. A passageway 65 extending between the outlet of the thermal treatment unit and the molding unit 63 is provided to prevent undesirable cooling of the heated containers by any air currents during their transfer (see FIG. 2).

It may be indicated here that, in the top portion of the controlled cooling area 54, mandrel-heating means (not shown in the drawings) are provided to heat or reheat the cold or cooled mandrels when the thermal treatment unit is started or restarted after a stoppage. These heating means work only temporarily; e.g., for the period during which all of the mandrels pass through them, i.e., one revolution of the conveyor chain 9. In this way, a more effective thermal treatment of the first "cycle" of containers is ensured when the equipment is initially started up.

The heating plates 27, 30 and 58 may be RAYMAX 1330 heaters manufactured by WATLOW, and the plates 44 may be RAYMAX 1120 heaters.

As appears evident and as emerges from the preceding description, the invention is not limited to the applications and embodiments detailed most specifically. To the contrary, it encompasses all variants.

we claim:

1. A continuous-feed thermal treatment unit for the manufacture of containers made of polyethyleneterephthalate (PET) and capable of withstanding, during use and without appreciable deformation, relatively severe thermal conditions encountered during processes filling the containers with a hot liquid or pasteurizing their contents, said unit comprising:

a) heating means for heating both the body and neck of each container, the body having preliminarily undergone bidirectional stretching and being heated to a temperature of 160° to 240° C. to produce contractive recovery followed by increased crystallization, and the neck being heated under temperature and time conditions suitable for producing spherulitic crystallization of the PET in the neck;

b) cooling means for lowering the temperature of both the neck and body of each container, wherein the neck is cooled relatively slowly to ensure the crystallization thereof;

c) wherein the heating means comprises:

1) means (27, 44) for heating the bodies of the containers positioned facing the bodies in proximity thereto along a path of conveyance thereof, extending continuously over approximately the height thereof, and configured to emit, in the direction of the bodies, medium-wavelength infrared radiation having a wavelength equal to or greater than 2 μm, said body-heating means comprising first heating means (27) for producing the contractive recovery and second heating means (44) for increasing the crystallization of the body; and 2) means (47) for heating the necks of the containers positioned opposite the necks along the path of conveyance and configured to emit, in the direction of the necks, short-wavelength infrared radiation having a wavelength to equal to or less than 2 μm, said neck-heating means being cooperable with internal heating mandrels (18) individually inserted inside the necks for supporting the containers during the conveyance thereof, said neck-heating means being positioned following the first heating means in the direction of conveyance and alongside the second heating means; and d) means (9, 10, 15) for modifying the spacing distance between adjacent containers such that a substantially large spacing distance (P) is provided along the length of the first heating means whereat said bodies have a substantially large transverse dimension, and a reduced spacing distance (p) is provided along the length of the second heating means and neck-heating means whereat the heated bodies have contracted and have reduced transverse and longitudinal dimensions.

2. A thermal treatment unit according to claim 1, further comprising third heating means (58) for heating the container bodies before a final molding of the containers, said third heating means being positioned following the cooling means in the path of conveyance.

3. A thermal treatment unit according to claim 2, further comprising, downstream from the third heating means, means (62) for increasing the spacing distance between adjacent containers to enable a gripping device to be interposed between successive containers to transfer them from the thermal treatment unit.

4. A thermal treatment unit according to claim 2, further comprising, downstream from the third heating means (58), a passageway (65) through which the containers heated by said third heating means travel, in order to prevent them from cooling.

5. A thermal treatment unit according to claim 2, wherein the first, second and third heating means (27, 44, 58) comprise heating plates extending over approximately the height of said bodies.

6. A thermal treatment unit according to claim 5, wherein plates (27, 30) of the first heating means are arranged on opposite sides of the path followed by the container bodies.

7. A thermal treatment unit according to claim 5, wherein the container body-heating plates are cooperable with loose guide rollers (45) made of a material which is inert to heat softened PET and positioned opposite a lower part of the container bodies, such that deformed container bodies are prevented from contacting said plates.

8. A thermal treatment unit according to claim 5, further comprising safety means (31–35, 37–39; 59–61) cooperable with the heating plates for increasing the distance between said heating plates and adjacent container bodies in the event of a conveyance stoppage of said containers.

9. A thermal treatment unit according to claim 8, wherein the safety means comprises a pneumatic jack (59) cooperable with the neck supporting means (16) to cause the release and fall of said containers.

10. A thermal treatment unit according to claim 8, wherein said safety means comprise a mobile support mechanism for holding the heating plates and moving said plates away from stopped container bodies, and at least one pneumatic jack (35, 39) for driving said mobile support mechanism.

11. A thermal treatment unit according to claim 10 wherein said mobile support mechanism comprises at least one bracket (31) supporting at least one said heating plate (27) and resting on at least one horizontal slide-track (32) extending transversely in relation to the path of conveyance of the container bodies, and wherein, once activated, said safety means moves the heating plates transversely away from the stopped container bodies.

12. A thermal treatment unit according to claim 10, wherein said mobile support mechanism comprises at least one bracket supporting at least one said heating plate (30) and supported by at least one vertical slide-track (37), and wherein, once activated, the safety means removes the heating plates by lowering them below or raising them above a level of the stopped container bodies.

13. A thermal treatment unit according to claim 1, wherein the neck-heating means (47) comprises heating tubes extending parallel to the path of conveyance of the containers.

14. A thermal treatment unit according to claim 1, further comprising an endless conveyor chain (9) for transporting the containers, said chain comprising a series of links (12) joined together by respective pivot axes (13), each link carrying means (16) for supporting the neck of a container; wherein the means for modifying the spacing distance between containers comprises:
   a) a plurality of radially-projecting arms (15) rigidly and individually attached to the links of the conveyor chain and extending transversely thereto, the free ends of said arms mounting the container neck supporting means;
   b) a convex curvilinear support (10) for movably supporting the links of the conveyor chain while the arms attached thereto extend to the outside of the convexity, thus producing a large spacing distance between containers; and
   c) at least one rectilinear support following the curvilinear support for movably supporting the links of the conveyor chain while the arms are approximately parallel, thereby producing a reduced spacing distance between containers;
and wherein the means for heating the container bodies and the means for heating the container necks are configured in approximately parallel fashion in relation to the path of conveyance of the chain, the body-heating means being positioned approximately parallel to the curvilinear support for the conveyor chain, and the neck-heating means being at least partially positioned parallel to the rectilinear support for the conveyor chain.

15. A thermal treatment unit according to claim 14, wherein the curvilinear support is a rotating wheel and the first heating means (27) are positioned in a contour forming approximately an arc of a circle substantially parallel to a rim of said wheel.

16. A thermal treatment unit according to claim 14, further comprising means (8) for preheating the container necks before the mandrels are inserted in them, the outer diameter of said mandrels corresponding to the inner diameter of the necks.

17. A thermal treatment unit according to claim 16, wherein each neck supporting means (16) includes a mandrel (18), which is forcefully inserted into the neck of a container to support the container suspended by its neck.

18. A thermal treatment unit according to claim 1, wherein the neck-heating means extends partially (48) into an area occupied by the body-heating means (27).

19. A thermal treatment unit according to claim 18, wherein the neck- and body-heating means are combined and comprise high plates (48) which extend over the entire height of the containers.

20. A thermal treatment unit according to claim 1, further comprising means (46) for heating the bottoms of the containers positioned below the body-heating means and laterally therefrom, so as to heat the container bottoms without causing crystallization of central areas of said bottoms.

21. A thermal treatment unit according to claim 1, wherein the cooling means comprise convection heating means (55) for maintaining a temperature of between 80° and 200° C. surrounding the containers.

22. A thermal treatment unit according to claim 1, further comprising means for thermally protecting mechanical devices of the unit by blowing a curtain of cooling gas between said mechanical devices and the heating means, wherein the frame of the unit is made at least partially of tubular sections (49), and wherein said cooling gas is distributed by said tubular sections.

23. A thermal treatment unit according to claim 1, wherein the first heating means (27) are positioned on one side of the path of conveyance followed by the container bodies, and wherein a mirror (29) is positioned on the other side of the path.

24. A thermal treatment unit according to claim 1, wherein, in the crystallization area, said unit comprises centering pins (66) positioned coaxially beneath said mandrels and cooperable with concave container bottoms, said centering pins being spaced apart by the same distance as that separating the mandrels and traveling in synchronism therewith.

25. A thermal treatment unit according to claim 1, further comprising means for reheating cold mandrels positioned downstream from the body-heating means, said reheating means being activated during start-up of the unit.

* * * * *